United States Patent
More et al.

(10) Patent No.: US 7,814,494 B1
(45) Date of Patent: Oct. 12, 2010

(54) METHOD AND SYSTEM FOR PERFORMING RELIABLE RESOURCE LOCKING

(75) Inventors: Sandhya More, Bangalore (IN); Ruchi Goel, Bangalore (IN)

(73) Assignee: Oracle America, Inc., Redwood City, CA (US)

( * ) Notice: Subject to any disclaimer, the term of this patent is extended or adjusted under 35 U.S.C. 154(b) by 1447 days.

(21) Appl. No.: 11/212,253

(22) Filed: Aug. 26, 2005

(51) Int. Cl.
  *G06F 9/46* (2006.01)
  *G06F 9/455* (2006.01)
  *G06F 12/00* (2006.01)
(52) U.S. Cl. ............................ 718/104; 718/1; 710/200
(58) Field of Classification Search .................. 718/104, 718/1; 710/200
  See application file for complete search history.

(56) References Cited

U.S. PATENT DOCUMENTS

| | | | |
|---|---|---|---|
| 5,920,873 A * | 7/1999 | Van Huben et al. ......... | 707/202 |
| 2003/0208500 A1 * | 11/2003 | Daynes et al. .............. | 707/100 |
| 2003/0217092 A1 * | 11/2003 | Veselov ..................... | 709/106 |
| 2004/0221079 A1 * | 11/2004 | Goldick ..................... | 710/200 |
| 2004/0230972 A1 * | 11/2004 | Donovan et al. ............. | 718/1 |

* cited by examiner

Primary Examiner—Meng-Ai An
Assistant Examiner—Nikhil Krishnan
(74) Attorney, Agent, or Firm—Osha • Liang LLP

(57) ABSTRACT

A method for performing reliable resource locking for a requested resource that includes determining whether the requested resource is locked, and, if the requested resource is not locked, then obtaining a lock for the requested resource, determining whether a resource entry associated with the requested resource is in a log object, wherein the log object is associated with a container performing a process requesting the requested resource, and if the resource entry is not in the log object, then adding the resource entry associated with the requested resource to the log object, and accessing the requested resource by the process.

20 Claims, 3 Drawing Sheets ized. JAVA™ is a cross-platform object oriented programming language. In order to support the variety of platforms (i.e. Operating Systems), such as Solaris™, Microsoft® Windows, Unix®, Linux®, and MacOS® by Apple® Computer, Inc. (located in Cupertino, Calif.) and ensure JAVA™ applications are portable, JAVA™ programs are compiled into JAVA™ byte code by the JAVA™ Compiler and executed by the JAVA™ Virtual

METHOD AND SYSTEM FOR PERFORMING RELIABLE RESOURCE LOCKING

BACKGROUND OF INVENTION

A typical computer system has several processes that perform functions on one or more resources. A process is a series of actions, changes, or procedures that bring about a result. A process may be an instance of an application in execution or a thread in execution. The resource that the process uses may be a file, a socket, a database, or virtually any other object. The process may try to modify the resource in some manner or simply read from the resource.

As a mechanism to provide greater throughput in execution, processes are often executed concurrently. Thus, during execution of one process, another process may also execute. While concurrent execution provides better throughput, concurrent execution may also have an effect on the reliability of the resources. For example, two processes may try to access the same resource at the same time. Reliability of the resource is ensured when more than one process can access the same resources seamlessly without any loss of data, corruption of data, non-availability of product feature, or without suffering performance degradation.

One programming language used in designing the applications of the processes is JAVA™ developed by Sun Microsystems™, Inc. (located in Santa Clara, Calif.). JAVA™ is a cross-platform object oriented programming language. In order to support the variety of platforms (i.e. Operating Systems), such as Solaris™, Microsoft® Windows, Unix®, Linux®, and MacOS® by Apple® Computer, Inc. (located in Cupertino, Calif.) and ensure JAVA™ applications are portable, JAVA™ programs are compiled into JAVA™ byte code by the JAVA™ Compiler and executed by the JAVA™ Virtual Machine. Once the JAVA™ Virtual Machine has been implemented for a particular computer running a particular platform, JAVA™ bytecode may be executed on the particular computer. The JAVA™ Virtual Machine acts as a container for the JAVA™ application. Accordingly, a single instance of the JAVA™ Virtual Machine may run one or more applications and/or one or more instances of the same application. Further, one or more instances of the JAVA™ Virtual Machine may be executed on the same computer. Regardless of the number of JAVA™ instances of one or more applications, for each instance of the JAVA™ Virtual Machine executing on the computer, the operating system recognizes only one application running on the computer.

Thus, if two or more applications are operating on the same JAVA™ Virtual Machine and requesting the same resource, the Operating System recognizes the requests as coming from the same application. Accordingly, the operating system is unable to ensure reliability of a resource shared by the multiple instances running on the same JAVA™ Virtual Machine.

One method for ensuring reliability is to use a separate application of a locking server. In this method, the only route to the resource is through the locking server. Specifically, each process must register with the locking server an identification of the resource the process is interested in accessing. If a process is trying to access the same resource that is already registered with the locking server by another process, then the process is refused access to the resource.

Another mechanism for reliability in resource sharing is for the process to check for a file associated with the resource before accessing the resource. If the file exists, then another process is accessing the resource and the first process must wait. Once a process has completed accessing the resource, then the process deletes the file associated with the resource.

SUMMARY OF INVENTION

In general, in one aspect, the invention relates to a method for performing reliable resource locking for a requested resource that includes determining whether the requested resource is locked, and, if the requested resource is not locked, then obtaining a lock for the requested resource, determining whether a resource entry associated with the requested resource is in a log object, wherein the log object is associated with a container performing a process requesting the requested resource, and if the resource entry is not in the log object, then adding the resource entry associated with the requested resource to the log object, and accessing the requested resource by the process.

In general, in one aspect, the invention relates to a system for performing reliable resource locking for a requested resource that includes a lock for the requested resource, wherein the lock is obtained by a process accessing the requested resource, and a log object associated with a container performing a process requesting the requested resource, wherein the log object is adapted to determine whether a resource entry associated with the requested resource is in the log object, if the resource entry is not in the log object, then adding the resource entry to the log object, and allowing access to the requested resource by the process In general, in one aspect, the invention relates to a computer readable medium comprising software instructions for performing reliable resource locking, comprising software instructions for determining whether the requested resource is locked, and if the requested resource is not locked, then obtaining a lock for the requested resource, determining whether a resource entry associated with the requested resource is in a log object, wherein the log object is associated with a container performing a process requesting the requested resource, and if the resource entry is not in the log object, then adding the resource entry associated with the requested resource to the log object, and accessing the requested resource by the process.

Other aspects and advantages of the invention will be apparent from the following description and the appended claims.

DETAILED DESCRIPTION

Figure 1:
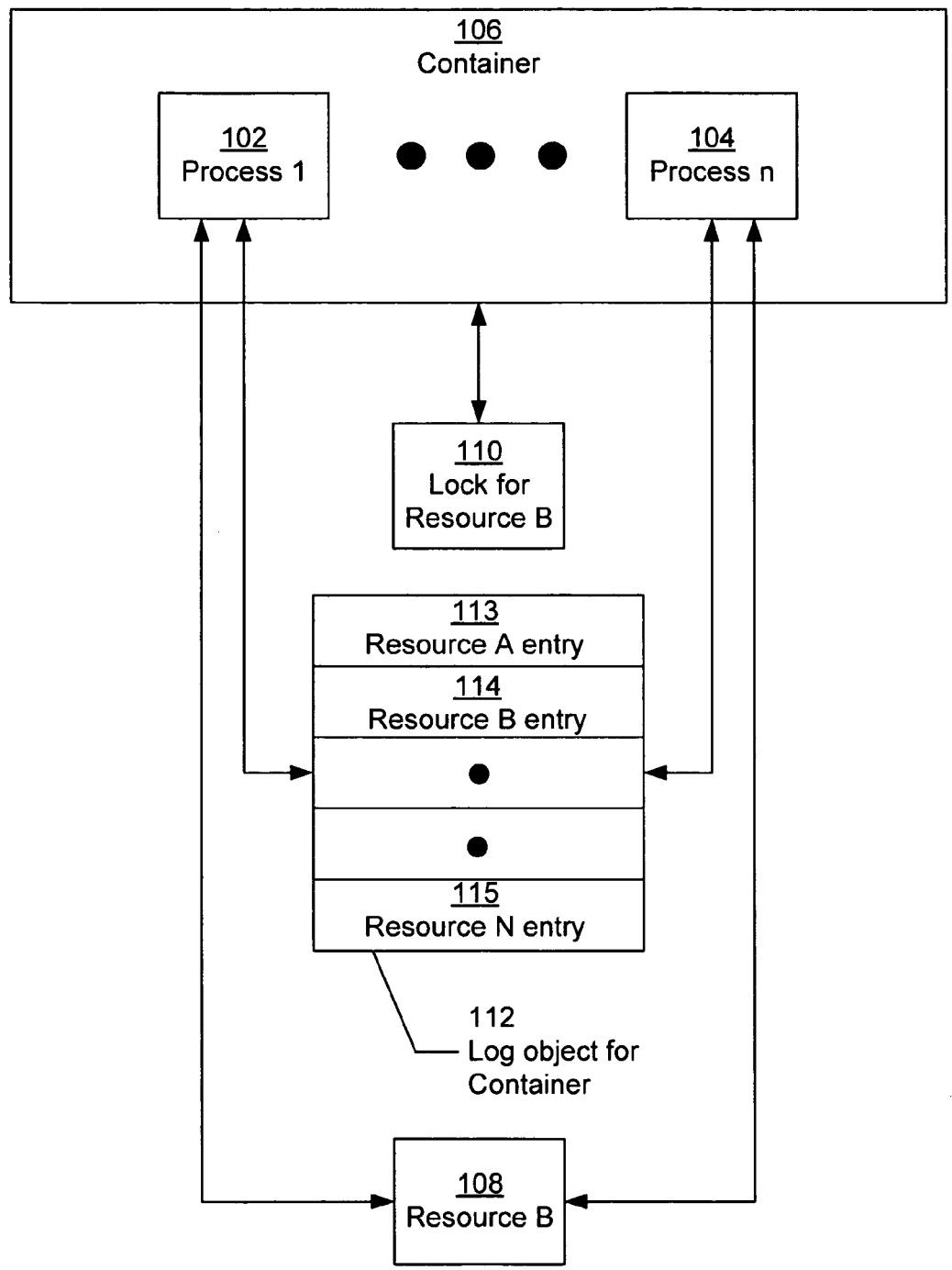
FIG. 1 shows a system for performing a reliable locking protocol in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention provide a method and system for performing a reliable locking protocol. Specifically, embodiments of the invention provide reliability without requiring an extra application and without requiring an extra file to be created for each resource. Reliability of the resource is ensured when more than one process can access the same resource seamlessly without any loss of data, corruption of data, non-availability of product feature, or without suffering performance degradation.

FIG. 1 shows a system for performing a reliable locking protocol accordance with one embodiment of the invention. Specifically, the system includes at least two processes (102, 104), a container (106), a resource (108), a lock for the resource (110), and a log object for the container (112). Each of the aforementioned components will be described in more detail below.

A process (102, 104) is a series of actions, changes, or procedures that bring about a result. For example, a process (102, 104) may be an instance of an application in execution or a thread of the instance of an application in execution. Further, process 1 (102) may be an instance of the same application or of a different application as process n (104). The application(s) which creates the processes (102, 104) may be written in virtually any programming language. For example, the application may be written in JAVA™ using JAVA™ 2 Enterprise Edition (J2EE) or JAVA™ 2 Standard Edition (J2SE), C, C++, Perl, etc.

In accordance with on embodiment of the invention, a process (102, 104) executes in a container (106). In accordance with one embodiment of the invention, a container (106) is an interface between the process (102, 104) and the underlying operating system. For example, a container may be the instance of a Virtual Machine, such as a Java™ Virtual Machine, a Coherent Virtual Machine, Parallel Virtual Machine, an implementation of the Common Language Runtime (CLR), etc., upon which a process operates (102, 104). As the JAVA™ Virtual Machine allows a JAVA application to be executed on any operating system, the underlying operating system may be Solaris™, Microsoft® Windows, Unix®, Linux®, MacOS® by Apple Computer, Inc., etc. Those skilled in the art will appreciate that process 1 (102) and process n (104) may be in different containers (106) or the same container (106) (as shown). Further, there may be one or more containers (106) that each have at least one process (102, 104) accessing the same resource B (108). Additionally, the different containers (106) may exist on the same computer system or on different computer systems.

Continuing with FIG. 1, process 1 (102) through process n (104) each access resource B (108). Resource B (108) may be a socket, file, database, a portion thereof, etc. Accessing resource B (108) may include writing to resource B (108), reading from resource B (108), modifying resource B (108), or modifying data associated with resource B (108). Those skilled in the art will appreciate that if all of the processes (102, 104) read from resource B (108), then the reliability may automatically be assured because no process modifies the resource. Accordingly, embodiments of the present invention may be able to distinguish between the different types of access to resource B (108), and only prevent access to resource B (108) when one of the accesses to resource B (108) is to modify the resource.

In order to assure reliability of the resource, a lock (110) is associated with resource B (108). In one embodiment of the invention, a lock (110) may either be advisory or mandatory. A mandatory lock is supported by the underlying platform, such as a single bit which is flipped when the resource is locked, a monitor, etc. The lock (110) could also be advisory, such as a separate lock file which is associated with resource B (108) and created when a process has access to resource B (108). In accordance with one embodiment of the invention, if the lock file associated with a resource exists, then the resource is locked. An advisory lock is not necessarily supported by the underlying operating system. Rather, an advisory lock requires cooperation among processes. In accordance with one embodiment of the inventions, the lock (110) is associated with the container (106) of the process (102, 104) requesting the lock (110) rather than the process (102, 104) itself. This may occur, for example, when the underlying operating system, such as Microsoft® Windows, is unable to distinguish between processes (102, 104) in the same container (106), such as the same Virtual Machine.

Continuing with FIG. 1, also associated with resource B (108) is an entry (114) in a log object (112) for the container (106). In one embodiment of the invention, a log object may include one or more entries (e.g., Resource A entry (113), Resource B entry (114), Resource N entry (115), etc.). A process may obtain information from the log object (112) in order to determine whether another process is accessing the same resource. In accordance with one embodiment of the invention, the log object is a Logger, such as a JAVA™ Logger. A Logger is used to log messages for a specific component, such as the container (106). Further, in accordance with one embodiment of the invention, the entries stored in the Logger are exported through Handlers, such as JAVA™ Handlers. The header of the Handler may contain uniquely identifying information of resource B (108). For example, the header of the Handler may contain the address of the file. Those skilled in the art will appreciate that identifying information may be stored in any other portion of the Handler. Further, the Handler may also store information regarding the type of access to resource B (108). Those skilled in the art will appreciate that the log object (112) may also be an array, a file, or virtually any other mechanism for storing information about a resource.

In accordance with one embodiment of the invention, each container (106) has an individual log object (112) associated with the container (106). Thus, several entries (e.g., 113, 114, 115) may exist for each resource (i.e., one entry for each of the multiple containers). Those skilled in the art will appreciate that the log object (112) may be associated with the system, or any part thereof, rather than just the container (106).

Figure 2:
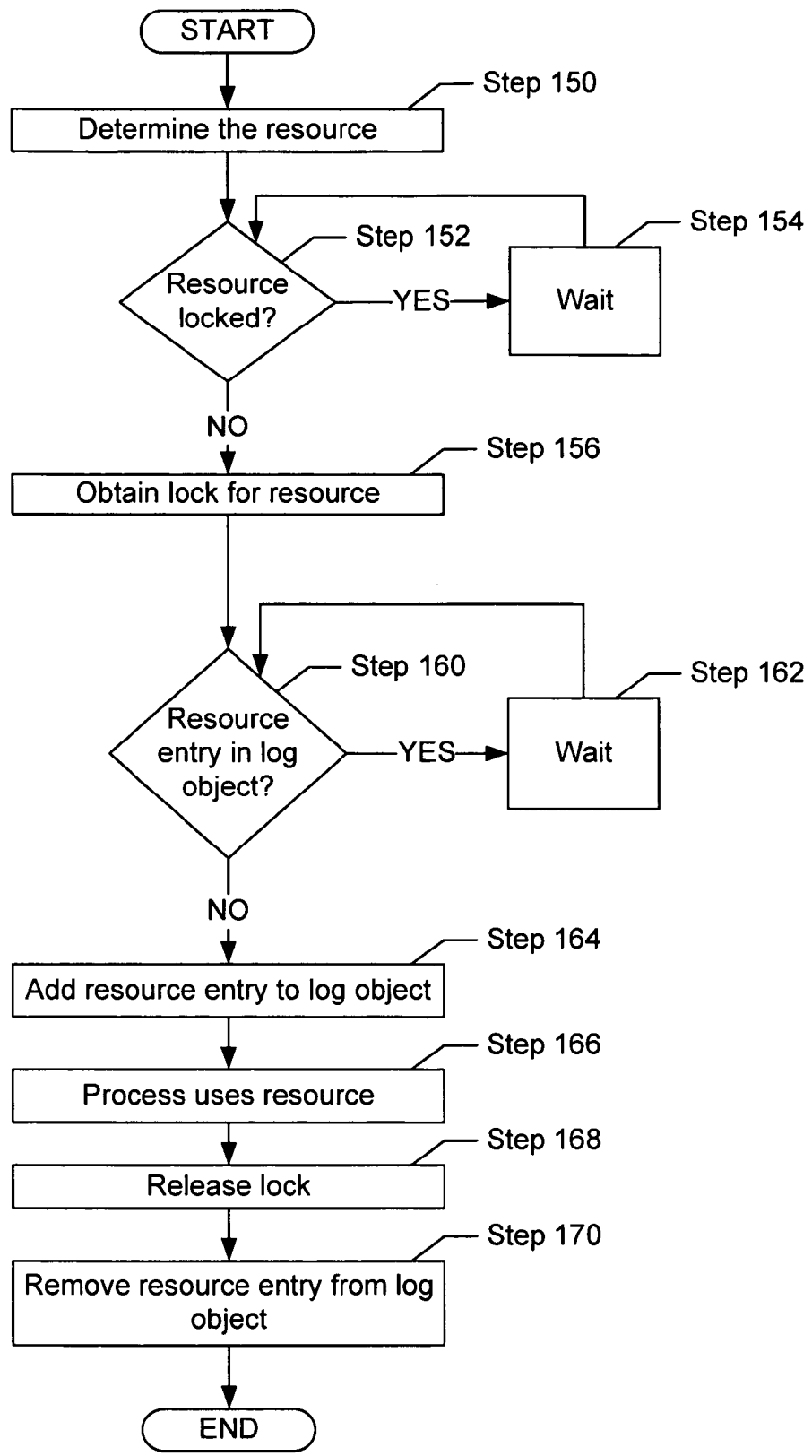
FIG. 2 shows a method for performing a reliable locking protocol in accordance with one embodiment of the invention.

FIG. 2 shows a method for performing a reliable locking protocol in accordance with one embodiment of the invention. Initially, the resource the process must use is determined (Step 150). Next, a determination is made as to whether the resource is already locked (Step 152). If the resource is already locked, then the process waits (Step 154) until the resource is unlocked. Otherwise, the lock for the resource is obtained (Step 156). Those skilled in the art will appreciate that as the underlying operating system is often unable to distinguish between processes in the same container, a process may be able to acquire the lock of a resource (Step 156) that is already locked by another process in the same container.

Continuing with FIG. 2, after acquiring the lock on the resource (Step 156), a determination is made as to whether the resource entry is in the log object (Step 160). Those skilled in the art will appreciate that as the log object may be an array or other such object(s) in which each position in the object(s) is associated with a specific resource, the entry associated with the resource may be checked to determine whether the resource is being accessed. Further, in accordance with one embodiment of the invention, as multiple processes may read from the resource simultaneously, the entry for the resource may store information showing the type of access. Thus, if the entry shows that that the resource is being accessed only by process(es) reading from the resource, then any other processes wanting to read from the resource may access the resource at the same time.

Continuing with FIG. 2, if the resource entry is in the log object, then the process waits until the resource entry is no longer in the log object (Step 162). Otherwise, no other process is accessing the resource, thus an entry is added to the log object (Step 164). Once the entry is added to the log object, then the process may use the resource (Step 166). After the process has completed using the resource, the process releases the lock on the resource (Step 168) and removes the resource entry from the log object (Step 170). Those skilled in the art will appreciate that rather than removing the entry from the log object (Step 170), the log object may be designed to show that the resource is not being accessed by a process modifying the resource (not shown).

A program may be designed to perform reliable locking protocol using a variety of schemas. For example, the following is an example of JAVA™ 2 Enterprise Edition (J2EE) code for performing reliable locking in which the resource is a file:

```
1    import java.io.FileOutputStream;
2    import java.io.FileNotFoundException;
3    import java.io.IOException;
4    import java.nio.channels.FileChannel;
5    import java.nio.channels.FileLock;
6    import java.util.logging.*;
7
8    public class ReliableFileLock {
9        long timeout;
10       String fileLockingLogger = "com.org.product.locklogger";
11
12       public void safeFileAccess( ) throws FileNotFoundException {
13           String myFileName = "/fullpath/filename.ext";
             //example of file name
14           String lockFileNameForMyFile = myFileName + ".lck";
15           FileOutputStream fo = new FileOutputStream
                 (lockFileNameForMyFile);
16           FileChannel fc = fo.getChannel( );
17           FileLock myFilelock = null;
18           try {
19               myFilelock = fc.lock( );
20               if (myFilelock != null) {
21                   while (true) {
22                       while (checkForMyHandler(myFileName)) {
23                           Thread.sleep(timeout);
24                       }
25                       if (addMyHandler(myFileName)) break;
26                   }
27
28                   //perform functions on the resource file
29                   //....
30
31               }
32           } catch (IOException e) {
33           }
34           catch (InterruptedException e) {
35           } finally {
36               if (myFilelock != null){
37                   try {
38                       myFilelock.release( );
39                       fo = null;
40                   } catch (IOException e) {
41                   }
42               }
43               synchronized(Logger.getLogger(fileLockingLogger)) {
44                   removeMyHandler(myFileName);
45               }
46           }
47       }
48
```

```
-continued 49       private boolean checkForMyHandler(String fileName) {
50           Logger logger = Logger.getLogger(fileLockingLogger);
51           Handler handlers[ ] = logger.getHandlers( );
52           for (int i = 0; i < handlers.length; i++) {
53               Handler myHandler = handlers[i];
54               if (myHandler.getFormatter( ).getHead(myHandler).equals
                     (fileName)){
55                   return true;
56               }
57           }
58           return false;
59       }
60
61       private boolean addMyHandler(final String fileName) throws
             IOException {
62           if (checkForMyHandler(fileName)){
63               return false;
64           }
65           Logger logger = Logger.getLogger(fileLockingLogger);
66           Handler myHandler = new Handler( ) {public void publish
                 (LogRecord rec) {
67           }
68               public void close( ) { }
69               public void flush( ) { }
70           };
71           myHandler.setFormatter(new Formatter( ) {
72               public String getHead(Handler handler) {
73                   return fileName;
74               }
75
76               public String format(LogRecord record) {
77                   return null;
78               }
79           });
80           logger.addHandler(myHandler);
81           return true;
82       }
83
84       private void removeMyHandler(String fileName) {
85           Logger logger = Logger.getLogger(fileLockingLogger);
86           Handler handlers[ ] = logger.getHandlers( );
87           for (int i = 0; i < handlers.length; i++) {
88               Handler myHandler = handlers[i];
89               if (myHandler.getFormatter( ).getHead(myHandler).equals
                     (fileName)){
90                   logger.removeHandler(myHandler);
91               }
92           }
93       }
94   }
```

The above exemplary JAVA™ code has a main operating method called safe file access (lines 12-47), a method to check for the resource file information in a logger object (lines 49-59), a method to add resource file information to the logger object (lines 61-82), and a method to remove file resource information from the logger object (lines 84-93). Each of these aforementioned methods are described in detail below.

In this example, the safe file method initially defines an example resource file, "/fullpath/filename.ext", that the process requests to use (line 13). Next, a lock file, which is uniquely associated with the resource file is created or obtained for the resource file (lines 14-17). Those skilled in the art will appreciate that alternatively, if the underlying platform supports locks, then process could acquire the lock of the resource file rather than creating a lock file associated with the resource file.

Continuing with the above exemplary JAVA™ code, after the process has access to the lock file, the process attempts to lock the lock file (line 19). If the process is successful in obtaining the lock to the lock file (line 20), then the process determines whether the resource file information is in the logger object associated with the current container (line 22). If the resource file information is already in the logger object, then another process is accessing the resource file and the process waits (line 23). Those skilled in the art will appreciate that the resource file information may be in the logger object with a indicator value which indicates whether the resource is in use and the type of use of the resource, such as read, write, modify, etc.

Continuing with the above exemplary JAVA™ code, if the resource file information is not in the logger object, then the resource file information is added to the logger object to allow the process to have access to the resource file (line 25). After the resource file information is added to the logger object (line 25), then the process executing the method may access the resource file (lines 27-30). When the process is finished with the resource file, then the process releases the lock on the lock file associated with the resource file (line 38) and removes the resource file information from the logger object (line 44)

Those skilled in the art will appreciate that while the above code identifies the resource file by the full path of the file and the file name of the file in the logger object, any other object which uniquely identifies the file to the logger may be used.

Continuing with the exemplary JAVA™ code provided above, lines 49-59 identify a method for checking to determine whether the resource file information is in the logger object. Initially, the logger object is obtained (line 50). If the logger object does not exist, then the logger object is created (line 50). Next, the handlers associated with the logger object are obtained and stored in an array (line 51). For each handler in the array, the header of the handler is checked to determine whether the resource file information is listed in the header (line 52-54). If the resource file information is in the header of a handler of the logger object, then the method returns true (line 55). Otherwise, once all handlers have been checked, then the resource file information is not in the logger object. Therefore the method returns false (line 58).

Continuing with the exemplary JAVA™ code, lines 61-82 describe a method for adding resource file information to the logger object. Initially, the logger object is checked to determine whether another process has added the resource file information to the logger object (line 62-64). Next, a new handler, which has a header equal to the resource file information, is created (line 66-79). Finally, the newly created handler is added to the logger (line 80) and the method returns that the addition was successful (line 81).

In order to remove the handler object from the logger object, lines 84-94 describe a method for removing the handler object from the logger object. Initially, the logger object and the array of handlers in the logger object are obtained (line 85-86). Next, each header of each handler is checked to find the resource file information (87-89). When the header is found, then the handler associated with the header is removed from the logger (line 90) and the method completes.

While the above exemplary JAVA™ code shows one possible certain schema for reliable resource file locking in accordance with one embodiment of the invention, those skilled in the art will appreciate that there are multiple schemas which are possible and which perform the similar steps as described above. Further, those skilled in the art will appreciate that J2EE code uses JAVA™ 2 Standard Edition (J2SE) packages. Accordingly, the above JAVA code could be J2SE as well as J2EE.

Figure 3:
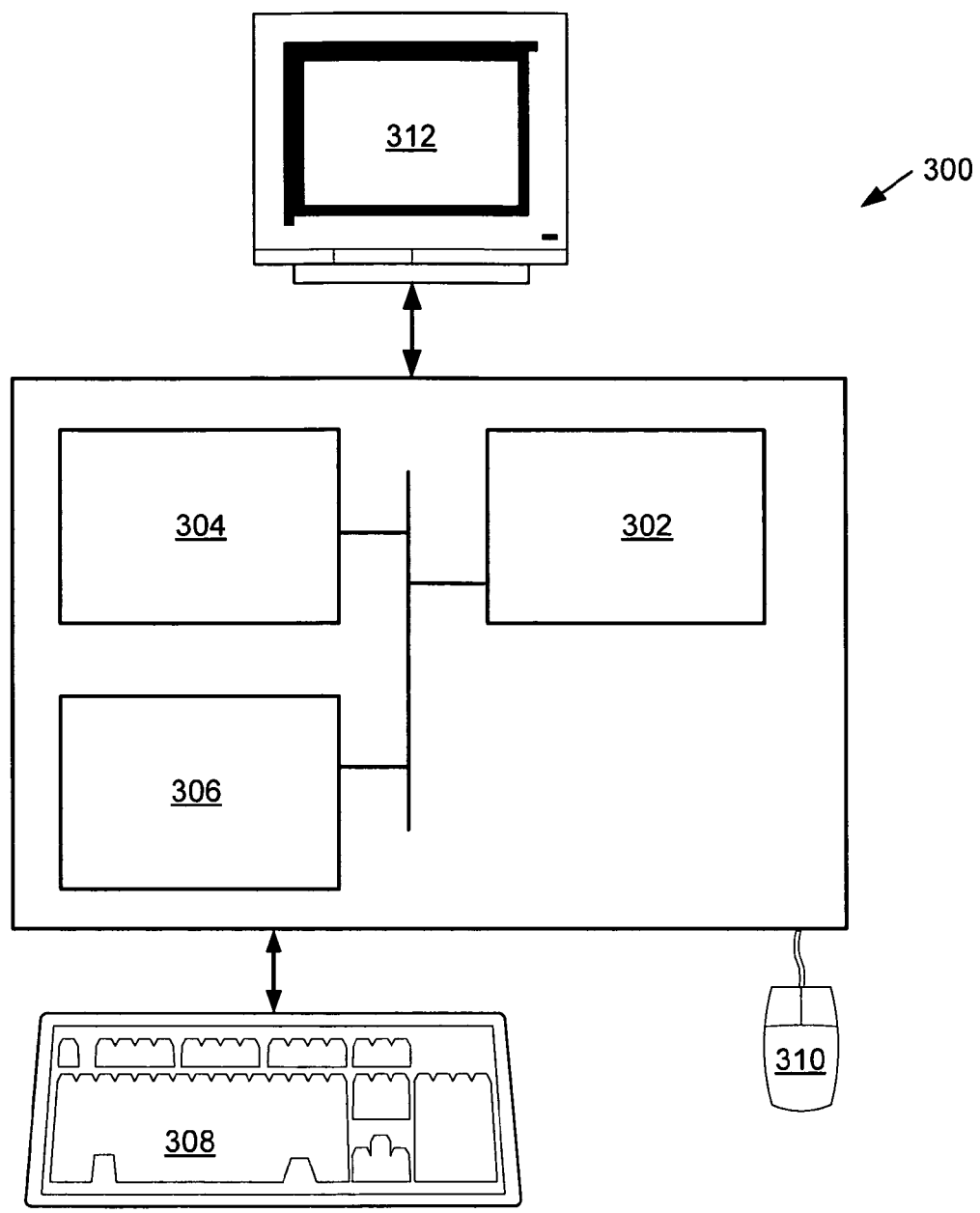
FIG. 3 shows computer system in accordance with one embodiment of the invention.

The invention may be implemented on virtually any type of computer regardless of the platform being used. For example, as shown in FIG. 3, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., process, log object, resource, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, a jump drive, or any other computer readable storage device.

Embodiments of the invention have one or more of the following advantages. First, implementing embodiments of the invention is simple. Specifically, with only a few extra lines of code, reliable resource locking is ensured. Further, a single routine which accomplishes reliable resource locking may be used for a variety of purposes, each of which have different deployment scenarios and platforms. Additionally, embodiments of the invention provide a lightweight mechanism by creating a simple object which is accessible by all processes. Further, greater performance may be achieved. For example, one or more embodiments of the invention do not require opening sockets or performing direct communication with other applications or processes.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing reliable resource locking for a requested resource comprising:

determining, by a first process executed by a hardware processor, that the requested resource is not locked by a second process executing within a first container, wherein the first process and a third process executes within a second container;

obtaining a lock for the requested resource;

determining, by the first process after obtaining the lock and prior to releasing the lock, that a resource entry associated with the requested resource is in a log object, wherein the log object is associated with the second container, wherein the resource entry is in the log object when, while the first process has the lock, the third process has the lock and has added the resource entry to the log object without removing the resource entry;

waiting until after the resource entry associated with the requested resource is removed from the log object by the third process when the third process completes accessing the requested resource based on determining that the resource entry is in the log object; and after the resource entry associated with the requested resource is removed from the log object:

adding, by the first process, the resource entry associated with the requested resource to the log object, and accessing the requested resource by the first process.

2. The method of claim 1, further comprising:

releasing the lock for the requested resource when the first process completes accessing the requested resource.

3. The method of claim 1, further comprising removing the resource entry from the log object when the first process completes accessing the requested resource.

4. The method of claim 1, wherein the log object is a logger object.

5. The method of claim 1, wherein obtaining the lock for the requested resource comprises:

creating a lock file associated with the requested resource.

6. The method of claim 1, wherein the resource entry is stored in a handler object of the log object.

7. The method of claim 6, wherein the resource entry is stored in the header of the handler object.

8. The method of claim 1, wherein the resource entry comprises the full path name and the file name of the requested resource.

9. The method of claim 1, wherein the second container is a Virtual Machine.

10. The method of claim 1, wherein the requested resource is a file.

11. A computer system for performing reliable resource locking for a requested resource comprising:

a lock for the requested resource, wherein the lock is obtained by a first process accessing the requested resource after determining that the requested resource is not locked by a second process executing within a first container, wherein the first process and a third process executes within a second container; and a log object associated with the second container, wherein the log object is adapted to:

determine, by the first process after obtaining the lock and prior to releasing the lock, that a resource entry associated with the requested resource is in the log object, wherein the resource entry is in the log object when, while the first process has the lock, the third process has the lock and has added the resource entry to the log object without removing the resource entry;

waiting until after the resource entry associated with the requested resource is removed from the log object by the third process when the third process completes accessing the requested resource based on determining that the resource entry is in the log object; and after the resource entry associated with the requested resource is removed from the log object:

adding, by the first process, the resource entry associated with the requested resource to the log object; and allowing access to the requested resource by the first process.

12. The computer system of claim 11, wherein the lock is released when the first process completes accessing the requested resource.

13. The computer system of claim 11, wherein the resource entry is removed from the log object when the first process completes accessing the requested resource.

14. The computer system of claim 11, wherein the log object is a logger object.

15. The computer system of claim 11, wherein the lock is a lock file.

16. The computer system of claim 11, wherein the resource entry is stored in a handler object of the log object.

17. The computer system of claim 16, wherein the resource entry is stored in the header of the handler object.

18. The computer system of claim 11, wherein the resource entry comprises the full path name and the file name of the requested resource.

19. The computer system of claim 11, wherein the second container is a Virtual Machine.

20. A computer readable medium comprising software instructions for performing reliable resource locking, which, when executed by a processor, cause a computer system to:

determine, by a first process, that the requested resource is not locked by a second process executing within a first container, wherein the first process and a third process executes within a second container;

obtain a lock for the requested resource;

determine, by the first process after obtaining the lock and prior to releasing the lock, that a resource entry associated with the requested resource is in a log object, wherein the log object is associated with the second container, wherein the resource entry is in the log object when, while the first process has the lock, the third process has the lock and has added the resource entry to the log object without removing the resource entry;

wait until after the resource entry associated with the requested resource is removed from the log object by the third process when the third process completes accessing the requested resource based on determining that the resource entry is in the log object; and after the resource entry associated with the requested is removed from the log object:

add, by the first process, the resource entry associated with the requested resource to the log object, and access the requested resource by the first process.

* * * * *

UNITED STATES PATENT AND TRADEMARK OFFICE
CERTIFICATE OF CORRECTION

PATENT NO. : 7,814,494 B1
APPLICATION NO. : 11/212253
DATED : October 12, 2010
INVENTOR(S) : Sandhya More et al.

It is certified that error appears in the above-identified patent and that said Letters Patent is hereby corrected as shown below:

In Claim 20, Column 10 (line 46), "resource" should be added after the word "requested".

Signed and Sealed this

Seventh Day of December, 2010

David J. Kappos
*Director of the United States Patent and Trademark Office*